March 13, 1962  J. B. WOODRUFF  3,024,808
HYDRAULIC COPYING OR TRACING VALVE UNITS
Filed Jan. 27, 1958
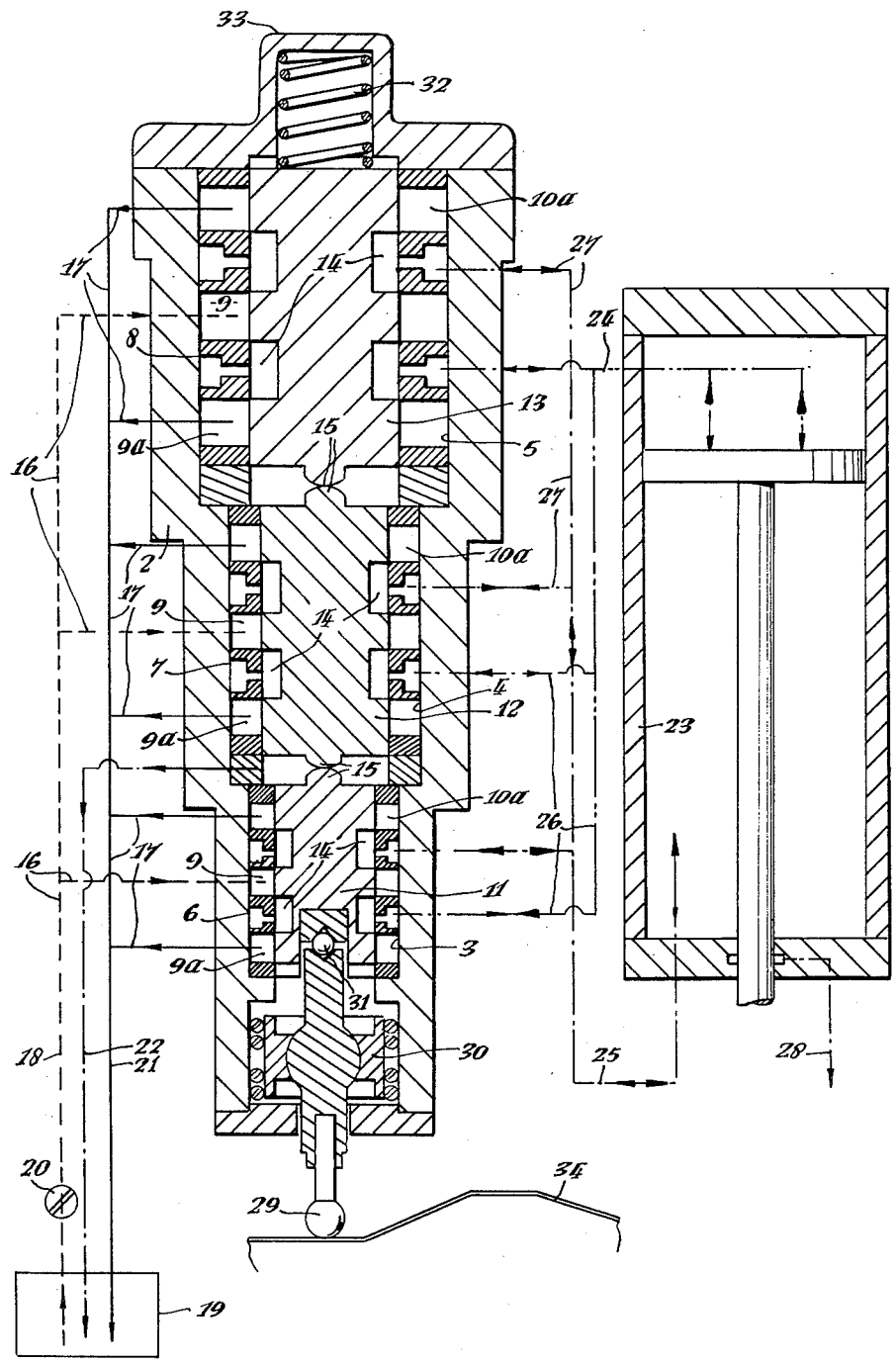

United States Patent Office 3,024,808
Patented Mar. 13, 1962

3,024,808
HYDRAULIC COPYING OR TRACING
VALVE UNITS
Joseph B. Woodruff, Leeds, England, assignor to Hayes Engineers (Leeds) Limited, Leeds, England, a British company
Filed Jan. 27, 1958, Ser. No. 711,476
Claims priority, application Great Britain Feb. 12, 1957
2 Claims. (Cl. 137—622)

This invention relates to hydraulic tracing servo valve units of the kind in which a stylus or other pressure-sensitive element (hereinafter called "a stylus") is maintained in contact with and moves over the surface of a master pattern or template (hereinafter called "a pattern") and is connected to a copying mechanism by a liquid pressure system, in such a manner that movements of the stylus, when following the profile of the pattern, cause a corresponding movement of the copying mechanism.

The invention is applicable to so-called "copy machine tools" adapted for the production of a number of identical products which correspond in shape to the shape of the pattern. In such machines, the copying mechanism includes a forming, shaping or cutting tool (hereinafter called "a copying tool") in movable relationship with a workpiece holder, the relative movement between the mounted workpiece and the copying tool being effected by an operating device such as a hydraulic motor controlled by movements of the stylus.

The normal form of valve unit includes a hydraulic valve plunger operated by movement of the stylus and connected with the hydraulic motor of the copying mechanism in such a way as to cause the copying mechanism to move in response to stylus movement. The stylus is mounted so that it can move axially and is spring-loaded to keep its tip in contact with the surface of the pattern. The mounting also permits the stylus to rock slightly about an axis normal to its main axis when it encounters lateral resistance due to the profile of the pattern. The valve plunger moves on an axis parallel to the axis of the stylus and is in positive engagement with the stylus so that axial movements of the stylus cause axial movements of the plunger. In cases where the profile of the pattern causes the stylus to rock slightly about the axis normal to its main axis, the rotary movement of the stylus is translated into a slight axial movement of the plunger. Thus, the mounting of the stylus and its engagement with the plunger are such that movement of the stylus tip in any plane will actuate the valve, and the valve is thereby enabled to control the volumetric rate of flow of liquid to the hydraulic motor of the copying mechanism.

In certain cases it is necessary to provide a relatively high flow of liquid in the system (for large copy machine tools, for example), and there has hitherto been the problem of solving the difficulty of also providing fine metering of liquid for small degrees of stylus movement.

It is known that the minimum flow through a tracing valve is determined by the minimum width of orifice through which oil will flow at a given pressure, i.e., due to skin strength of oil it may take an opening of .0003" at the orifice before flow commences. In the case of a spool valve, where the circular edge of an annular groove in the spool by axial displacement moves away from the circular edge of an annular port to develop a cylindrical orifice therebetween through which fluid flow is established between the groove and port, the width of this cylindrical orifice will be the distance between the two circular edges and the length of the orifice will be equal to the circumference of the two circular edges. Therefore, the shorter the orifice length is kept, i.e. the smaller the diameter of the spool at the edges of the annular port and groove, the lower is the volume of minimum flow, and therefore the slower will be the movement of a tracing slide, for example, actuated by the flow from such a short orifice. With maximum orifice openings predetermined, a valve of this type would give a smooth deceleration of volume of flow through the valve as the valve orifice opening approached zero, but a low rate of flow at maximum orifice opening.

In order to obtain high volumes of flow with a predetermined maximum orifice opening, a long orifice is demanded, and such a valve would give a fairly high rate of flow at minimum orifice opening. This would give a fairly fast initial movement of a tracing slide actuated by the flow from such a long orifice. This type of valve would give a high rate of volume of flow at maximum orifice opening, but as the valve orifice opening approaches zero, the minimum volume of flow obtained would be appreciable, ceasing suddenly as minimum orifice is passed. This sudden stopping of flow as the valve closes, or starting of flow as the valve is opened, is undesirable in a hydraulic tracing system.

According to the present invention there is provided a hydraulic tracer valve unit including at least two axially movable spool-type valve plungers mounted in a casing in alignment, said plungers being ported to co-act with inlet and outlet means in the unit casing and constructed so that one plunger is capable of a fine degree of control of hydraulic liquid in a system and the other plunger controlling a greater volume of liquid, said plungers being associated for simultaneous movement under the control of a stylus, the arrangement being such that small stylus movements can cause the first plunger to meter liquid and greater stylus movement cause the second plunger to automatically supplement the rate of flow of liquid.

The invention includes a hydraulic tracer valve unit incorporating multiple valve plungers in axial alignment in mechanical engagement with a common stylus for controlling all the plungers, said plungers having ports which are constructed to provide a progressive increase, and in a reverse movement decrease, in the volumetric rate of flow of liquid in a hydraulic system according to the movements of a stylus engaging a pattern.

The invention is now more particularly described with reference to the accompanying drawing which is in diagrammatic form for convenience in showing the hydraulic system and ports.

As shown the improved hydraulic tracer valve unit comprises a casing 2 having three cylindrical bores 3, 4 and 5 in alignment and of different diameters increasing from the smallest diameter at the lower end of the casing. For convenience, liner sleeves 6, 7 and 8 each having annular outlet ports 9a, 10a and an annular inlet port 9 therebetween are located in these bores to receive three spool-type valve plungers 11, 12 and 13 furnished with annular grooves 14 in their peripheries with the circular edges of these grooves co-act with the circular edges of the annular inlet and outlet ports in the liner sleeves to establish cylindrical orifices for fluid flow between these annular grooves and the related annular inlet and outlet ports. These plungers are in mechanical engagement, such as by being furnished with protuberances 15 having semi-spherical engaging faces, as shown, interposed ball or other bearings or other equivalent means, so that axial movement of the smaller lower plunger 11 will be transmitted to the upper larger plungers 12 and 13. Because of the differently-sized bores the external formation of the casing is stepped. Conveniently the inlet feed ports 9 and outlet exhaust ports 9a and 10a of the three liner sleeves register with common feed passages formed in the unit casing 2 but shown diagrammatically at 16 and 17 for connection to a hydraulic liquid system. In this manner connecting pipes will be kept to a minimum. The pressure feed pipe 18 can supply liquid from the reservoir 19 by means of a pump 20 with exhaust pipe 21, together with the drain pipe 22, leading back into the reservoir. As shown a hydraulic motor 23, which operates a machine tool part, for example, such as tool or slide, is connected to the valve unit through pipes 24, 25 which will be connected to a pair of common passages formed in the casing 2 for linking the grooves 14 and shown diagrammatically by the lines 26, 27. The usual drainage pipe 28 is provided from the cylinder of the motor 23. It will be observed the arrows indicate one direction of flow in the pipes 24 and 25 but the flow will reverse according to the control movements of the valve plungers. Thus it will be seen that the inlet and outlet ports coordinated to the several valve plungers 11–13 are connected hydraulically in parallel for feeding hydraulic fluid between the hydraulic fluid source and the hydraulic motor in accordance with displacement of the valve plungers.

At the base of the valve unit is arranged a stylus 29 and this is mounted in a bearing 30 (or other device) and so arranged that it can have both axial and rocking movements all of which are translated into axial movements of the first plunger 11 which in turn will move the second and third plungers 12, 13. Conveniently the upper stem of the stylus has mechanical connection with the first plunger through a ball bearing 31 located in conical or other cup recesses. To hold the stylus at rest a spring 32 is located in the unit in a removable top cover plate 33 to engage the upper plunger directly (or indirectly) and this spring-loading may, if desired, be adjustable.

It is now apparent that when the plungers 11, 12 and 13 are moved upwardly a sufficient amount by the cooperation of stylus 29 with cam 34, exhaust flow is permitted from the lower end of hydraulic motor 23 through line 25 via passages 27, through annular grooves 14 in plungers 11, 12 and 13 to ports 10a, and through passages 17 and exhaust pipe 21 to the reservoir 19. Oil under pressure is simultaneously pumped through pipe 18, passages 16, ports 9, annular grooves in plungers 11, 12 and 13, and through passages 26, 24 to the top face of the piston of hydraulic motor 23.

When plungers 11, 12 and 13 are displaced downwardly a sufficient amount, exhaust flow is permitted from the upper end of the hydraulic motor cylinder from pipe 24 via passage 26 through annular grooves in plungers 11, 12 and 13 to ports 9a, and through passage 17 and pipe 21 back to reservoir 19. Oil under pressure flows from ports 9 into grooves in plungers 11, 12 and 13 and through passages 27 and 25 to the under surface of the piston of hydraulic motor 23.

The construction of the aforesaid three plungers and their ports, any of which may be lapped, is such that the second larger plunger 12 is capable of passing a greater flow of liquid into the system 24, 25 to increase the volumetric rate of flow, than the first plunger 11 so that a slight axial movement of the first plunger can meter liquid without the other plunger passing any liquid through its ports. As the axial movement of the first plunger is increased, the rate of flow will automatically increase therewith and thus according to predetermined calculations the second plunger can be brought into commission at the required time so that a progressive or fluctuating rate of flow can be produced between given limits. It will be understood that as the translated axial movement increases the third plunger 13 will be brought into use to increase the rate of flow still further.

The unit can readily be designed to provide a required volumetric rate of flow by providing a calculated number of valve plungers in the unit and thus two or more than three may readily be provided to suit requirements, i.e., range of volume to be admitted through the system to a hydraulic motor or motors. Whilst the volume can be progressively increased, a reverse motion will progressively decrease so that a progressive retardation or reverse motion of a copying tool or slide can be obtained according to relative movements between stylus 29 and pattern 34.

The improved unit can include a small diameter tracing valve 11 giving short orifice lengths, to give low volume of flow characteristics at small orifice openings. The second valve 12 gives higher volume of flow characteristics due to increased diameter and therefore increased orifice length, has overlap on the ports and will not start to pass any flow until the volume of flow through the first valve exceeds the minimum volume of flow passed by the second valve. The third valve 13 being greater in diameter than the second and giving higher volume of flow characteristic than the said valve has increased overlaps on the ports, and will not start to pass any flow until the volume of flow through the first and second valves exceeds the minimum volume of flow passed by this third valve. This principle can be applied to such tracing valves which may have more than three sections in the valve, in order to meet the volume of flow demanded by any application. The above principles can be applied to valves fitted with or without sleeves 6, 7, 8.

The valve unit may include other features for controlling the unit parts of system but these do not form part of the present invention.

It will readily be understood that the improved unit provides a relatively simple control of copying mechanism on a copy machine tool whereby a stylus can follow a pattern which translates very slight movements to the stylus and thus a fine accurate degree of movement of the copy tool and at the same time can control the rate of flow in the system to a relatively large amount to provide the necessary pressure for a relatively large movement of the said tool.

What I claim is:

1. A servo valve comprising a casing having a cylindrical bore therein, said bore including at least a first portion of a given diameter and a second portion having a diameter greater than that of said first portion, first and second cylindrical valve plungers slidably mounted respectively in said first and second bore portions and having diameters corresponding respectively to the diameters of the bore portions in which they are located, said valve plungers being coupled for simultaneous sliding displacement together as a unit and each said valve plunger being provided with a pair of axially spaced annular grooves at the periphery thereof, each of said first and second bore portions having an annular inlet port communicable with one groove in the associated valve plunger and an annular outlet port communicable with the other groove of that valve plunger upon axial displacement thereof, said annular inlet and outlet ports coordinated to said first and second bore portions being connected hydraulically in parallel for feeding hydraulic fluid to and from a hydraulic motor in accordance with the axial displacement of said valve plungers, said second valve plunger because of its larger diameter resulting in a higher volume of fluid flow characteristic than that which obtains at said first valve plunger which has a smaller diameter as said valve plungers are displaced from a neutral position wherein said annular inlet and outlet ports are blocked by the respective body portions of said valve plungers to an operative position wherein said annular inlet and outlet ports are placed in communication with the associated grooves in their respective valve plungers, said second and larger diametered valve plunger having an overlap on the inlet and outlet ports which it controls to effect a delayed opening in relation to said first valve plunger such that hydraulic flow through the inlet and outlet ports controlled by said second valve plunger does not occur until the volume of hydraulic fluid flow through the ports controlled by said first valve plunger exceeds the minimum flow provided by the valving action at said second valve plunger whereby said first valve plunger exercises a fine degree of control of hydraulic fluid flow through the servo valve and said second valve plunger controls a greater volume of hydraulic fluid flow through the servo valve.

2. A servo valve as defined in claim 1 wherein each of said first and second bore portions is provided with a pair of annular outlet ports alternatively communicable with the grooves in the associated valve plunger dependent upon the direction of its displacement and the annular inlet port of each bore portion is disposed between and is similarly alternatively communicable with the grooves in the associated valve plunger.

References Cited in the file of this patent
UNITED STATES PATENTS

| | | |
|---|---|---|
| 1,231,628 | Lehr | July 3, 1917 |
| 1,859,876 | Koplin | May 24, 1932 |
| 2,612,184 | Evans | Sept. 30, 1952 |
| 2,726,581 | Roehm | Dec. 13, 1955 |
| 2,924,239 | Bjorklund | Feb. 9, 1960 |